US012330909B2

(12) United States Patent
Tang et al.

(10) Patent No.: US 12,330,909 B2
(45) Date of Patent: Jun. 17, 2025

(54) METHOD FOR COLLABORATIVELY CONTROLLING MULTI-CHANNEL BRAKING SYSTEM OF MINE HOIST

(71) Applicant: China University of Mining and Technology, Jiangsu (CN)

(72) Inventors: Yu Tang, Jiangsu (CN); Zhencai Zhu, Jiangsu (CN); Gang Shen, Jiangsu (CN); Hao Lu, Jiangsu (CN); Yuxing Peng, Jiangsu (CN); Gongbo Zhou, Jiangsu (CN); Hui Xie, Jiangsu (CN); Wei Wang, Jiangsu (CN); Deen Bai, Jiangsu (CN); Qingguo Wang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 18/690,743

(22) PCT Filed: Aug. 3, 2023

(86) PCT No.: PCT/CN2023/110982
§ 371 (c)(1),
(2) Date: Mar. 11, 2024

(87) PCT Pub. No.: WO2024/055769
PCT Pub. Date: Mar. 21, 2024

(65) Prior Publication Data
US 2025/0136407 A1    May 1, 2025

(30) Foreign Application Priority Data

Sep. 15, 2022    (CN) .......................... 202211122933.9

(51) Int. Cl.
*B66B 1/36*    (2006.01)
*B66B 5/02*    (2006.01)
(Continued)

(52) U.S. Cl.
CPC ................ *B66B 1/365* (2013.01); *B66B 5/02* (2013.01); *F16D 66/026* (2013.01);
(Continued)

(58) Field of Classification Search
CPC ......... B66B 1/365; B66B 5/02; F16D 66/026; F16D 2066/003; F16D 2066/005; F16D 2121/02
See application file for complete search history.

(56) References Cited

U.S. PATENT DOCUMENTS

| | | | |
|---|---|---|---|
| 6,047,793 A * | 4/2000 | Hasegawa | F16D 55/40 188/1.11 W |
| 11,893,547 B2 * | 2/2024 | Lu | G06Q 10/20 |

(Continued)

FOREIGN PATENT DOCUMENTS

| | | | | |
|---|---|---|---|---|
| AU | 2014278372 A1 * | 11/2015 | | B61H 1/00 |
| CN | 201834649 | 5/2011 | | |

(Continued)

OTHER PUBLICATIONS

"International Search Report (Form PCT/ISA/210) of PCT/CN2023/110982," mailed on Nov. 23, 2023, pp. 1-4.
(Continued)

*Primary Examiner* — Jeffrey Donels
(74) *Attorney, Agent, or Firm* — JCIPRNET (57) ABSTRACT

The present disclosure discloses a method for collaboratively controlling a multi-channel braking system of a mine hoist, including obtaining the abrasion loss of the brake shoe by detecting position information of the brake shoe of each of disc brakes in real time, dividing abrasion loss levels by determining different abrasion degrees of the brake shoe, formulating three braking force distributing modes: an average distribution, a proportional distribution, and an index distribution according to the abrasion loss levels, thereby
(Continued)

dynamically adjusting a set braking pressure of each of the disc brakes, tracking and controlling the set braking pressure through the disc brakes by adopting a pressure closed-loop control method by utilizing a pressure signal feedback from an oil pressure sensor, implementing a collaborative braking control of the multi-channel braking system of the mine hoist based on the abrasion loss of the brake shoe.

9 Claims, 3 Drawing Sheets

(51) Int. Cl.
  *F16D 66/00* (2006.01)
  *F16D 66/02* (2006.01)
  *F16D 121/02* (2012.01)
(52) U.S. Cl.
  CPC .. *F16D 2066/003* (2013.01); *F16D 2066/005* (2013.01); *F16D 2121/02* (2013.01)

(56) References Cited

U.S. PATENT DOCUMENTS

2014/0000990 A1* 1/2014 Shiraki ............... F16D 65/567
  188/71.8
2020/0270097 A1* 8/2020 Robibero ............. B66B 5/0031

FOREIGN PATENT DOCUMENTS

| CN | 102303800 | 1/2012 | |
|---|---|---|---|
| CN | 111285281 | 6/2020 | |
| CN | 113847368 | 12/2021 | |
| CN | 215370693 | 12/2021 | |
| CN | 115448199 | 12/2022 | |
| JP | 2012127418 | 7/2012 | |
| WO | WO-2014200974 A1 * | 12/2014 | ............ B61H 1/00 |

OTHER PUBLICATIONS

"Written Opinion of the International Searching Authority (Form PCT/ISA/237) of PCT/CN2023/110982," mailed on Nov. 23, 2023, pp. 1-4.

* cited by examiner

METHOD FOR COLLABORATIVELY CONTROLLING MULTI-CHANNEL BRAKING SYSTEM OF MINE HOIST

CROSS-REFERENCE TO RELATED APPLICATION

This application is a 371 of international application of PCT application serial no. PCT/CN2023/110982, filed on Aug. 3, 2023, which claims the priority benefit of China application serial no. 202211122933.9, filed on Sep. 15, 2022. The entirety of each of the above-mentioned patent applications is hereby incorporated by reference herein and made a part of this specification.

TECHNICAL FIELD

The present disclosure relates to the technical field of mine hoist, and specifically relates to a method for collaboratively controlling a multi-channel braking system of a mine hoist.

RELATED ART

As key equipment responsible for tasks such as lifting materials and equipment, elevating personnel in coal productions, the safety and the reliability of the mine hoist not only directly affect the productions and economic benefits of the entire mine, but most importantly are related to the life safety of the miners. As the most critical safety guarantee equipment of the hoist, the braking device has an extremely important impacts on mineral productions and the life safety of the miners in terms of its operational safety. With the increasing requirements for the transportation capacity and the safety of the mine hoist, researchers develop a multi-channel braking system to enhance the safety of the braking process of the mine hoist. A constant deceleration braking of the hoist is implemented by each of the independent disc brakes according to the same deceleration command signals and the same speed feedback signals. In this way, each of the disc brakes obtains the same braking force given signal, which is driven by a separate proportional directional valve to complete the braking force tracking control. Theoretically, each of the disc brakes maintains the same braking pressure during the braking process. However, due to the factors such as differences on hydraulic pipeline layouts, brake installation errors, and directional valve pressure flow characteristics, and differences on response characteristics of the disc brakes, the issues of uneven abrasion of the brake shoes will be inevitably caused. Applying the same set braking pressure to each of the disc brakes currently leads to a phenomenon of increased abrasion of the single or a plurality of brake shoes of the disc brakes, resulting in issues such as a decreased braking performance, a reduced service life, and even braking failures, which not only affects the production efficiency, but also brings significant risks to braking safety.

SUMMARY OF INVENTION

The objectives of the present disclosure are to provide a method for collaboratively controlling a multi-channel braking system of a mine hoist, which is capable of implementing dynamic distributions of the braking force, ensuring a consistency in abrasion of multiple brake shoes of the disc brakes, solving the issues of uneven abrasions of the brake shoes, and thereby improving the safety of the mine hoist operations.

Solution to Problem

In order to realize the above objectives, the present disclosure provides a method for collaboratively controlling a multi-channel braking system of a mine hoist. The control method is based on a multi-channel braking system and the multi-channel braking system includes a plurality of disc brakes. Each of the disc brakes is controlled by an independent proportional control valve, and an oil pressure sensor and a displacement sensor are arranged on each of the disc brakes. And the control method includes the following steps.

In Step S1, initial position information $x_{is0}$ and $x_{iy0}$ of a brake shoe as well as an initial thickness $\Delta_{i0}$ of the brake shoe in the case where each of the disc brakes is completely released and compressed, are measured by utilizing a displacement sensor respectively, where i denotes an i_th disc brake.

In Step S2, a position $x_{is}$ of the brake shoe when the disc brake is completely released is recorded by utilizing the displacement sensor before the braking command is issued, and a position $x_{iy}$ of the brake shoe when the disc brake is fully compressed is recorded by utilizing the displacement sensor after the braking command is issued, in the case where a hoist system is officially put into use.

In Step S3, an abrasion loss $\Delta_i$ of the brake shoe, and a total abrasion loss $\Delta_{sum}=\Sigma_{i=1}^{n}\Delta_i$ of the brake shoe in the braking system are calculated according to the measured position information of the disc brake, where n denotes the number of the disc brakes and an average abrasion loss of the brake shoe is denoted as $\Delta_{avg}=\Sigma_{i=1}^{n}\Delta_i/n$, a percentage $\lambda_{avg}$ of the average abrasion loss of the brake shoe relative to the total abrasion loss of the brake shoe is calculated according to the physical quantities, and a calculation formula thereof is:

$$\lambda_{avg} = \frac{\Delta_{avg}}{\Delta_{sum}} = \frac{1}{n}.$$

In Step S4, a percentage $\lambda_i$ of an abrasion loss of the brake shoe of the i-th disc brake relative to the total abrasion loss, and an abrasion loss rate $\eta_i$ of the abrasion loss of the brake shoe of the i-th disc brake relative to the total abrasion loss are calculated, and calculation formulas thereof are:

$$\lambda_i = \frac{\Delta_i}{\Delta_{sum}} = \frac{(x_{iy} - x_{is}) - (x_{iy0} - x_{is0})}{\sum_{i=1}^{n}\Delta_i},$$

$$\eta_i = \frac{\Delta_i}{\Delta_{i0}}.$$

In Step S5, an abrasion loss degree of the brake shoe of the disc brakes is divided into three abrasion loss levels by comparing $\lambda_i$ with $\lambda_{avg}$. The abrasion loss level is classified as an abrasion loss level I in the case of $\lambda_i \leq k_1\lambda_{avg}$, the abrasion loss level is classified as an abrasion loss level II in the case of $k_1\lambda_{avg} < \lambda_i \leq k_2\lambda_{avg}$, and the abrasion loss level is classified as an abrasion loss level III in the case of $\lambda_i > k_2\lambda_{avg}$. Three different distributing means on a total required braking force $F_{ref}$ are executed according to different abrasion loss levels of the brake shoe of the disc brakes.

And $k_1$ and $k_2$ denote coefficients for dividing the abrasion loss level of the brake shoes respectively.

In Step S6, in the case where the abrasion loss level of the brake shoe of the disc brakes is the abrasion loss level I, a total braking force $F_{sum}$ obeys an equal distribution principle, and a braking force distribution value $F_i$ of the disc brakes is set as:

$$F_i = \frac{F_{sum}}{n}.$$

In Step S7, in the case where the abrasion loss level of the brake shoe of the disc brakes is the abrasion loss level II, the total braking force $F_{sum}$ obeys a proportional distribution principle, and the braking force distribution value $F_i$ of the disc brakes is set as:

$$F_i = F_{sum} \cdot \frac{\Delta_{i0} - \Delta_i}{\sum_{i=1}^{n}(\Delta_{i0} - \Delta_i)}.$$

In Step S8, in the case where the abrasion loss level of the brake shoe of the disc brakes is the abrasion loss level III, the total braking force $F_{sum}$ obeys an index distribution principle, and the braking force distribution value $F_i$ of the disc brakes is set as:

$$F_i = F_{sum} \frac{e^{(\Delta_{i0} - \Delta_i)}}{\sum_{i}^{n} e^{(\Delta_{i0} - \Delta_i)}}.$$

In Step S9, a closed-loop tracking control of the disc brake for the braking force distribution value $F_i$ is implemented driven by a proportional directional valve, by utilizing a pressure signal feedback from the oil pressure sensor arranged on an oil inlet chamber of the disc brake, after completing a distribution of a braking pressure for the disc brake.

In Step S10, a braking task is completed, a dynamic distribution of the braking force is implemented, and Step S1 to Step S9 are repeated in the case of requiring a subsequent braking operation.

Further, in Step S7, whether to have a situation where the braking force distribution value $F_i$ of the disc brakes is greater than $F_{max}$ is determined. $F_{max}$ denotes a maximum braking force that a single disc brake is capable of supplying. it is indicated that the disc brake reaches the maximum braking force that the single disc brake is capable of supplying, that is, the braking force of the disc brake is saturated, when the braking force distribution value $F_i$ of the disc brakes is greater than $F_{max}$. The number m of the disc brakes that reach the saturated braking force is detected. For j disc brakes that reach the maximum braking force, a braking force distribution value is set as $F_j = F_{max}$, j=1, . . . ,m. A remaining required braking force $F_{sur} = F_{sum} - m \cdot F_{max}$ is calculated, and a braking force $F_{sur}$ is redistributed for n−m disc brakes that do not reach the saturated braking force, and a braking force distribution value $F_i$ of the n−m disc brakes that do not reach the saturated braking force is set as:

$$F_i = F_{sur} \cdot \frac{\Delta_{i0} - \Delta_i}{\sum_{i=1}^{n-m}(\Delta_{i0} - \Delta_i)}.$$

Further, in Step S8, whether to have a situation where the braking force distribution value $F_i$ of the disc brakes is greater than $F_{max}$ is determined. It is indicated that the disc brake reaches the maximum braking force that the single disc brake is capable of supplying, that is, the braking force of the disc brake is saturated, when the braking force distribution value $F_i$ of the disc brakes is greater than $F_{max}$. The number m of the disc brakes that reach the saturated braking force is detected. For m disc brakes that reach the maximum braking force, a braking force distribution value is set as $F_j = F_{max}$, j=1, . . . ,m. A remaining required braking force $F_{sur} = F_{sum} - m \cdot F_{max}$ is calculated, and a braking force $F_{sur}$ is redistributed for n−m disc brakes that do not reach the saturated braking force, and a braking force distribution value $F_i$ of the n−m disc brakes that do not reach the saturated braking force is set as:

$$F_i = F_{sur} \cdot \frac{e^{(\Delta_{i0} - \Delta_i)}}{\sum_{i}^{n-m} e^{(\Delta_{i0} - \Delta_i)}}.$$

Further, in a case where it is indicated that the brake shoe of the disc brake is failed when the abrasion loss rate $\eta_i$ of the brake shoe of the i-th disc brake is greater than or equal to $\eta_{max}$, the hoist is terminated for maintenance, the brake shoe is replaced, and then Step S2 is performed. And $\eta_{max}$ denotes a set safety threshold for the abrasion loss rate of the brake shoe.

Further, the safety threshold $\eta_{max}$ for the abrasion loss rate of the brake shoe ranges from 15% to 25%.

Further, the coefficients k1 and k2 for dividing the abrasion loss level of the brake shoes range from 1.5 to 2.5, and from 4.5 to 5.5, respectively.

Further, the proportional control valve is a three-position and four-way proportional control valve.

Further, a center position of a valve core of the three-position and four-way proportional control valve is a fully covered structure.

Further, the multi-channel braking system includes eight channels, one disc brake is arranged on each of the channels, and eight disc brakes are symmetrically distributed on both sides of a brake disc.

Effects of Invention

The beneficial effects of the present disclosure are as follows. In the present disclosure, three abrasion loss levels are divided according to the degree of the abrasion loss by detecting the abrasion loss of the brake shoe of the each of the disc brakes; three braking force distribution strategies: an average distribution, a proportional distribution, and an index distribution are formulated according to the abrasion loss levels; each of the disc brakes dynamically sets the braking force according to the different abrasion losses of the brake shoes, thereby implementing the collaborative control of the multi-channel braking system based on the abrasion loss of the brake shoes, and ensuring the consistency in abrasion of multiple brake shoes of the disc brakes.

In drawings, 1. Drum; 2. Brake disc; 3. Disc brake; 4. Three-position and four-way proportional control valve; 5. Oil pressure sensor; 6. Displacement sensor.

DESCRIPTION OF EMBODIMENTS

The present disclosure will be further described in detail below in combination with the drawings and the specific embodiments.

Figure 1:
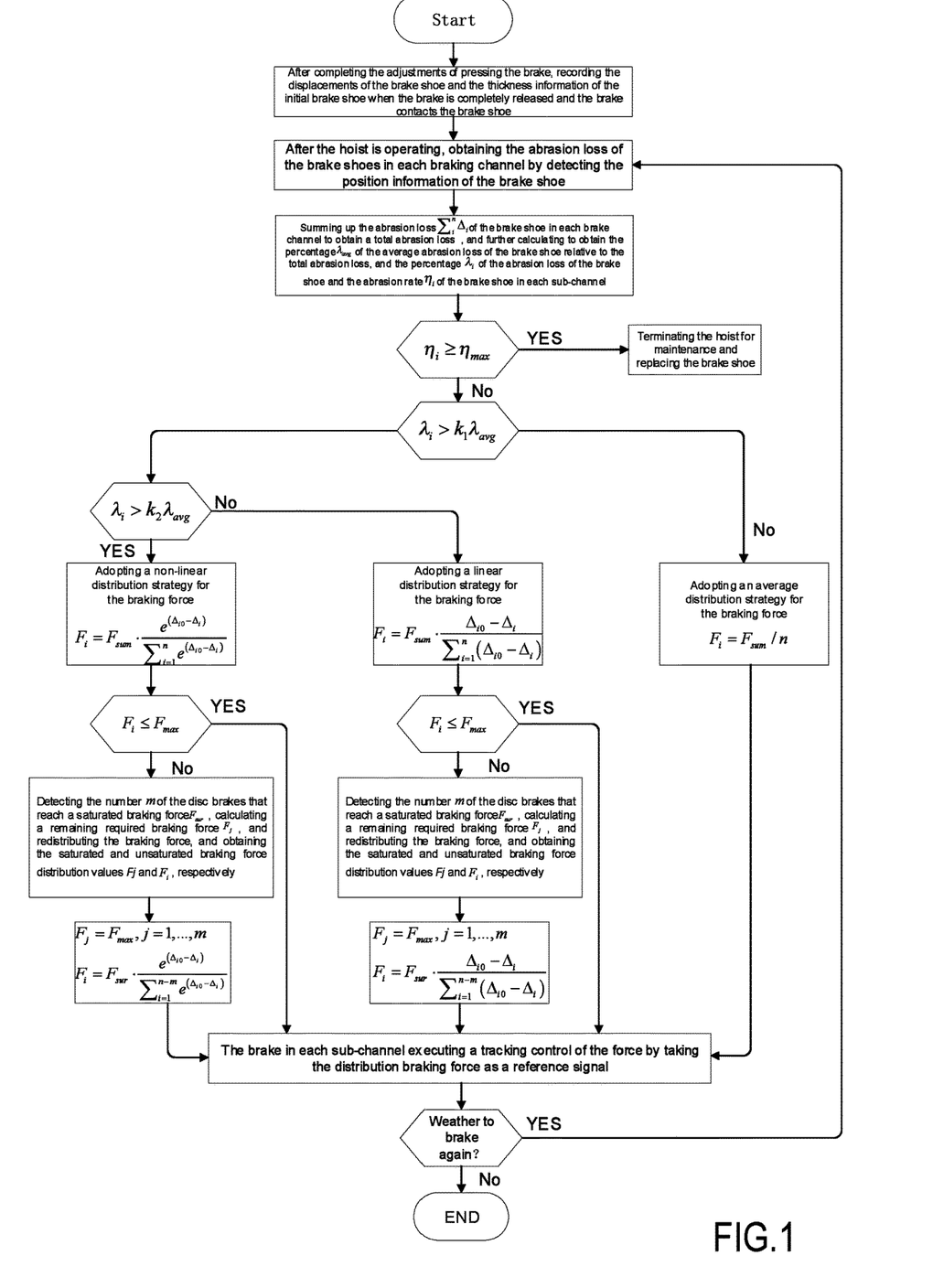
FIG. 1 illustrates a flowchart of a method for distributing a braking force of a multi-channel braking system of a mine hoist.
Figure 2:
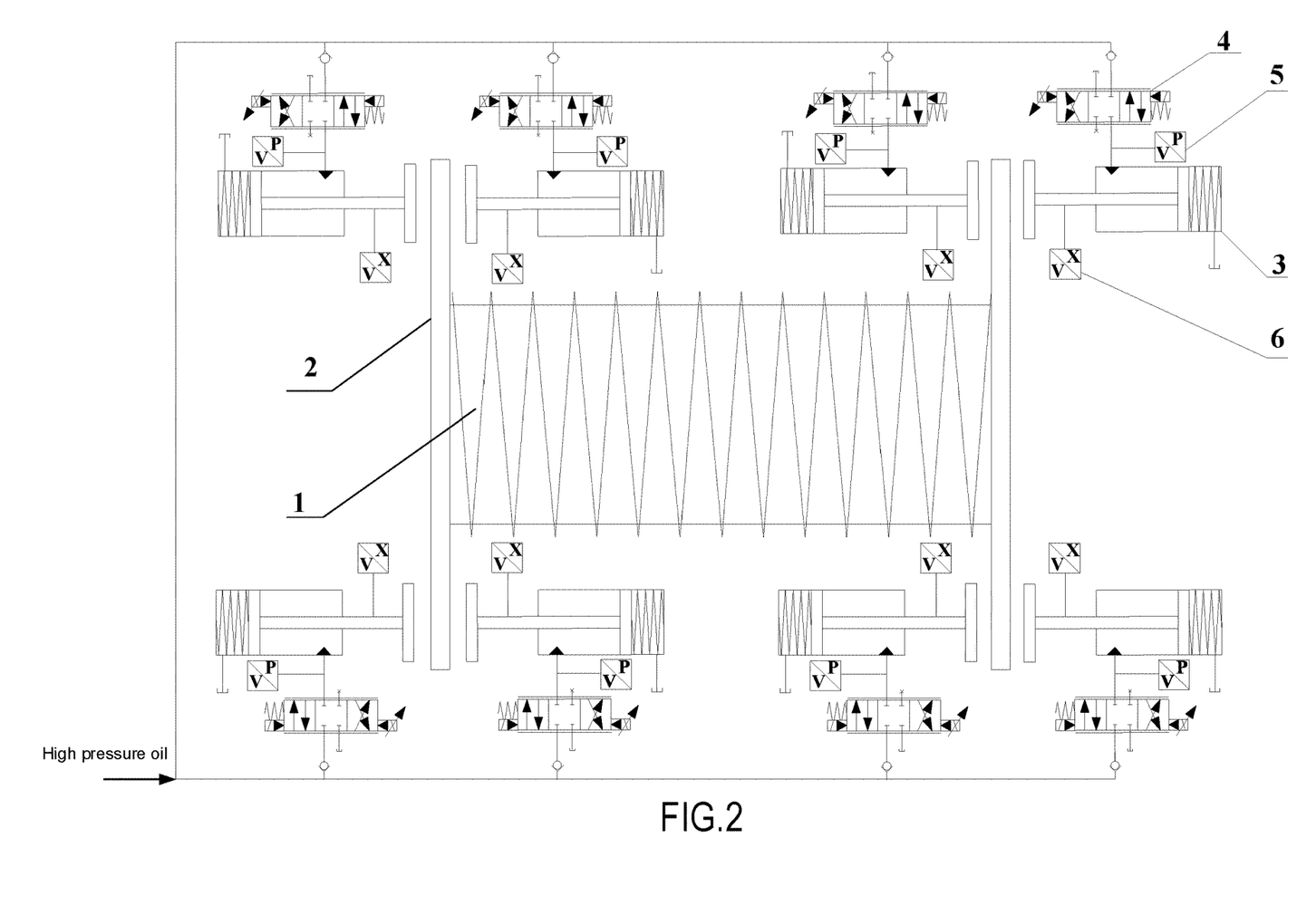
FIG. 2 illustrates a schematic diagram of the multi-channel braking system of the mine hoist.

Provided is a method for collaboratively controlling a multi-channel braking system of a mine hoist, and the control method is based on the multi-channel braking system. As illustrated in FIG. 2, brake discs 2 are arranged on both sides of drum 1. Eight disc brakes 3 are symmetrically arranged on both sides of the drum 2. The oil inlet and outlet chambers of each of the disc brakes 3 are connected to a three-position and four-way proportional directional valve 4 through hydraulic pipelines and the eight three-position and four-way proportional directional valves 4 are independently connected to the hydraulic pump station. In order to prevent the disc brake from acting caused by hydraulic oil entering and exiting the brake due to the zero deviation of the directional valve, a center position of a valve core of the three-position and four-way proportional control valve adopted by the present disclosure is a fully covered structure. In addition, a hydraulic sensor 5 is arranged on the oil inlet and outlet chambers of each of the disc brakes 3, and a displacement sensor 6 is arranged on one side proximity to the brake disc 2.

The control method includes the following steps.

In Step S1, the initial position information $x_{is0}$ of the brake shoe in the case where each of the disc brakes is completely released and the initial position information $x_{iy0}$ of the brake shoe in the case where each of the disc brakes is completely compressed and an initial thickness $\Delta_{i0}$ of the brake shoe when the brake shoe is not braked are measured respectively by utilizing a displacement sensor that arranged on the disc brake 3. And i denotes an i-th disc brake.

In Step S2, the position information $x_{is}$ of the brake shoe when the disc brake is completely released is recorded by utilizing the displacement sensor 6 that is arranged on the disc brake before the braking command is issued, in the case where the hoist system is officially put into use. Similarly, the position information $x_{iy}$ of the brake shoe when the disc brake is fully compressed is recorded by utilizing the displacement sensor 6 that is arranged on the disc brake 3 after the braking command is issued, in the case where the hoist system is officially put into use.

In Step S3, an abrasion loss $\Delta_i$ of the brake shoe of the i-th disc brake 3 is calculated according to the measured position information of the disc brake 3, and the calculation formula is $\Delta_i = (x_{iy} - x_{is}) - (x_{iy0} - x_{is0})$. A total abrasion loss of the brake shoe in the multi-channel braking system is $\Delta_{sum} = \Sigma_{i=1}^{n} \Delta_i$, and the calculation formula is $\Delta_{sum} = \Sigma_{i=1}^{n} \Delta_i$, where n is the number of the disc brakes 3. The average abrasion loss of the brake shoe is $\Delta_{avg}$, and the calculation formula is $\Delta_{avg} = \Sigma_{i=1}^{n} \Delta_i / n$. The percentage $\lambda_{avg}$ of the average abrasion loss of the brake shoe of the disc brake 3 relative to the total abrasion loss of the brake shoe is calculated according to the physical quantities, and the calculation formula of the percentage $\lambda_{avg}$ is:

$$\lambda_{avg} = \frac{\Delta_{avg}}{\Delta_{sum}} = \frac{1}{n}.$$

In Step S4, a percentage $\lambda_i$ of an abrasion loss of the brake shoe of the i-th disc brake 3 relative to the total abrasion loss, and an abrasion loss rate $\eta_i$ of the abrasion loss of the brake shoe of the i-th disc brake relative to the total abrasion loss are calculated, and calculation formulas of the percentage $\lambda_i$ and the abrasion loss rate $\eta_i$ are:

$$\lambda_i = \frac{\Delta_i}{\Delta_{sum}} = \frac{(x_{iy} - x_{is}) - (x_{iy0} - x_{is0})}{\sum_{i=1}^{n} \Delta_i},$$

$$\eta_i = \frac{\Delta_i}{\Delta_{i0}}.$$

In a case where it is indicated that the brake shoe of the disc brake is failed when the abrasion loss rate $\eta_i$ of the brake shoe of the i-th disc brake 3 is greater than or equal to $\eta_{max}$, the hoist is terminated for maintenance, the brake shoe is replaced, and then Step b) is performed. And $\eta_{max}$ denotes a set safety threshold for the abrasion loss rate of the brake shoe. The safety threshold $\eta_{max}$ for the abrasion loss rate of the brake shoe ranges from 15% to 25%.

In Step S5, an abrasion loss degree of the brake shoe of the disc brakes 3 is divided into three abrasion loss levels by comparing $\lambda_i$ with $\lambda_{avg}$. The abrasion loss level is classified as an abrasion loss level I in the case of $\lambda_i \leq k_1 \lambda_{avg}$, the abrasion loss level is classified as an abrasion loss level II in the case of $k_1 \lambda_{avg} < \lambda_i \leq k_2 \lambda_{avg}$, and the abrasion loss level is classified as an abrasion loss level III in the case of $\lambda_i \leq k_2 \lambda_{avg}$ ($k_1$ and $k_2$ are coefficients for dividing the abrasion loss level of the brake shoes respectively). Three different distributing means are executed on a total required braking force $F_{ref}$ according to different abrasion loss levels of the brake shoes of the disc brakes 3. The coefficients k1 and k2 for dividing the abrasion loss level of the brake shoes range from 1.5 to 2.5 and from 4.5 to 5.5, respectively.

In Step S6, in the case where the abrasion loss level of the brake shoe of the disc brakes 3 is the abrasion loss level I, a total braking force $F_{sum}$ obeys an equal distribution principle, and a braking force distribution value $F_i$ of the disc brakes is set as:

$$F_i = \frac{F_{sum}}{n}.$$

In Step S7, in the case where the abrasion loss level of the brake shoe of the disc brakes 3 is the abrasion loss level II, the total braking force $F_{sum}$ obeys a proportional distribution principle, and the braking force distribution value $F_i$ of the disc brakes is set as:

$$F_i = F_{sum} \cdot \frac{\Delta_{i0} - \Delta_i}{\sum_{i=1}^{n} (\Delta_{i0} - \Delta_i)}.$$

Whether to have a situation where the braking force distribution value $F_i$ of the disc brakes 3 is greater than $F_{max}$ is determined ($F_{max}$ denotes a maximum braking force that a single disc brake is capable of supplying). It is indicated that the disc brake 3 reaches the maximum braking force that the single disc brake is capable of supplying, that is, the braking force of the disc brake 3 is saturated, when the braking force distribution value $F_i$ of the disc brakes 3 is greater than $F_{max}$. The number m of the disc brakes 3 that reach the saturated braking force is detected. For j disc brakes 3 that reach the maximum braking force, a braking force distribution value is set as $F_j=F_{max}$, j=1, . . . ,m. A remaining required braking force $F_{sur}=F_{sum}-m\cdot F_{max}$ is calculated, and a braking force $F_{sur}$ is redistributed for n−m disc brakes that do not reach the saturated braking force, and a braking force distribution value $F_i$ of the n−m disc brakes that do not reach the saturated braking force is set as:

$$F_i = F_{sur} \cdot \frac{\Delta_{i0} - \Delta_i}{\sum_{i=1}^{n-m}(\Delta_{i0} - \Delta_i)}.$$

In Step S8, in the case where the abrasion loss level of the brake shoe of the disc brakes 3 is the abrasion loss level III, the total braking force $F_{sum}$ obeys an index distribution principle, and the braking force distribution value $F_i$ of the disc brakes 3 is set as:

$$F_i = F_{sum} \cdot \frac{e^{(\Delta_{i0} - \Delta_i)}}{\sum_i^n e^{(\Delta_{i0} - \Delta_i)}}.$$

Whether to have a situation where the braking force distribution value $F_i$ of the disc brakes 3 is greater than $F_{max}$ is determined ($F_{max}$ denotes a maximum braking force that a single disc brake 3 is capable of supplying). It is indicated that the disc brake 3 reaches the maximum braking force that the single disc brake is capable of supplying, that is, the braking force of the disc brake 3 is saturated, when the braking force distribution value $F_i$ of the disc brakes 3 is greater than $F_{max}$. The number m of the disc brakes 3 that reach the saturated braking force is detected. For m disc brakes 3 that reach the maximum braking force, the braking force distribution value is set as $F_j=F_{max}$, j=1, . . . ,m. A remaining required braking force $F_{sur}=F_{sum}-m\cdot F_{max}$ is calculated, and a braking force $F_{sur}$ is redistributed for n−m disc brakes 3 that do not reach the saturated braking force, and a braking force distribution value $F_i$ of the n−m disc brakes that do not reach the saturated braking force is set as:

$$F_i = F_{sur} \cdot \frac{e^{(\Delta_{i0} - \Delta_i)}}{\sum_i^{n-m} e^{(\Delta_{i0} - \Delta_i)}}.$$

In Step S9, a closed-loop tracking control of the disc brake 3 for the braking force distribution value $F_i$ is implemented driven by the three-position and four-way proportional control valve 4 by utilizing a pressure signal feedback from the oil pressure sensor 5 arranged in the oil inlet and outlet chambers of the disc brake 3, after completing distribution of a braking pressure for the disc brake 3.

In Step S10, a braking task is completed, a dynamic distribution of the braking force is implemented, and Steps S1 to Step S9 are repeated in the case of requiring a subsequent braking operation.

Figure 3:
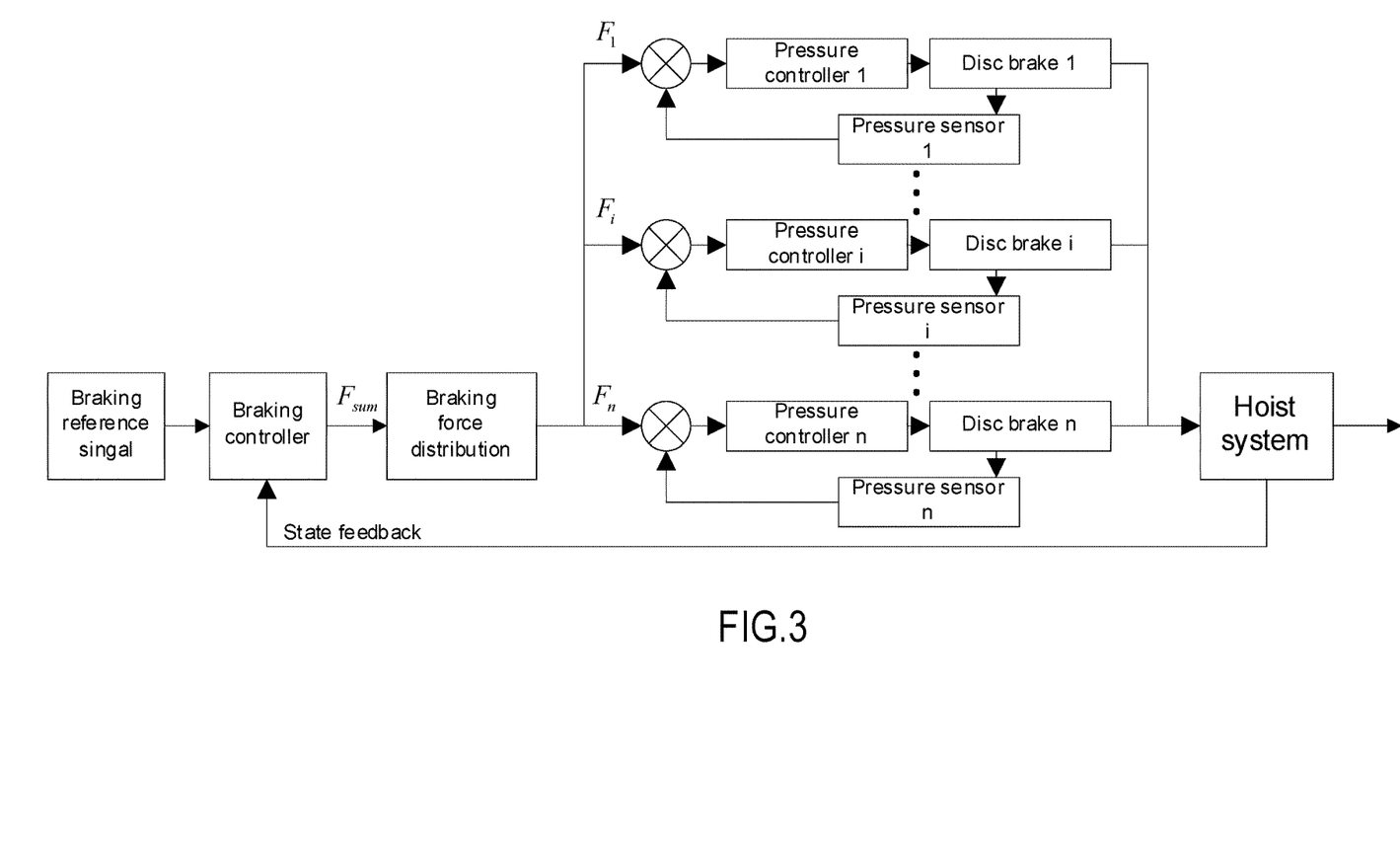
FIG. 3 illustrates a schematic diagram of a braking force distribution control for the multi-channel braking system of the mine hoist.

The principle of the collaborative control structure of the multi-channel braking system of the mine hoist is as illustrated in FIG. 3. The total braking force $F_{sum}$ is calculated by the braking controller, by utilizing the feedback of the hoist system states under setting hoist braking reference signals. Then, the braking force distribution value $F_i$ is obtained by utilizing Step S1 to Step S9, and finally, by utilizing the three-position and four-way proportional control valve and the oil pressure sensor, a closed-loop tracking control of the braking force distribution value of the disc brake is completed, eventually, the collaborative braking control of the multi-channel braking system is implemented.

The embodiments of the present disclosure are described in detail above in conjunction with the accompanying drawings, but the present disclosure is not limited thereto. Without departing from the spirit of the present disclosure, various changes can be made by a person skilled in the art, those all within the protection scope of the claims of the present disclosure.

What is claimed is:
1. A method for collaboratively controlling a multi-channel braking system of a mine hoist, wherein the control method is based on the multi-channel braking system, the multi-channel braking system comprises a plurality of disc brakes, each of the disc brakes is controlled by an independent proportional control valve, and an oil pressure sensor and a displacement sensor are arranged on each of the disc brakes, and the control method includes following steps:
   Step S1, respectively measuring, by utilizing the displacement sensor, initial position information $x_{is0}$ and $x_{iy0}$ of a brake shoe as well as an initial thickness $\Delta_{i0}$ of the brake shoe in a case where each of the disc brakes is completely released and compressed, where i denotes an i_th disc brake;
   Step S2, recording, by utilizing the displacement sensor, a position $x_{is}$ of the brake shoe when the disc brake is completely released before a braking command is issued, and a position $x_{iy}$ of the brake shoe when the disc brake is fully compressed after the braking command is issued, in a case where a hoist system is officially put into use;
   Step S3, calculating, according to the measured position information of the disc brake, an abrasion loss $\Delta_i$ of the brake shoe, and a total abrasion loss $\Delta_{sum}=\Sigma_{i=1}^{n}\Delta_i$ of the brake shoe in the braking system, where n denotes a number of the disc brakes and an average abrasion loss of the brake shoe is denoted as $\Delta_{avg}=\Sigma_{i=1}^{n}\Delta_i/n$, calculating, according to the physical quantities, a percentage $\lambda_{avg}$ of the average abrasion loss of the brake shoe relative to the total abrasion loss of the brake shoe, and a calculation formula of the percentage $\lambda_{avg}$ being:

$$\lambda_{avg} = \frac{\Delta_{avg}}{\Delta_{sum}} = \frac{1}{n},$$

Step S4, calculating a percentage $\lambda_i$ of an abrasion loss of the brake shoe of the i_th disc brake relative to the total abrasion loss, and an abrasion loss rate $\eta_i$ of the brake shoe of the i_th disc brake, and calculation formulas of the percentage $\lambda_i$ and the abrasion loss rate $\eta_i$ being:

$$\lambda_i = \frac{\Delta_i}{\Delta_{sum}} = \frac{(x_{iy} - x_{is}) - (x_{iy0} - x_{is0})}{\sum_{i=1}^{n}\Delta_i},$$

$$\eta_i = \frac{\Delta_i}{\Delta_{i0}};$$

Step S5, dividing, by comparing $\lambda_i$ with $\lambda_{avg}$, an abrasion loss degree of the brake shoe of the disc brakes into three abrasion loss levels; classifying, in a case of $\lambda_i \leq k_1 \lambda_{avg}$, as an abrasion loss level I, classifying, in a case of $k_1 \lambda_{avg} < \lambda_i \leq k_2 \lambda_{avg}$, as an abrasion loss level II, and classifying, in a case of $\lambda_i > k_2 \lambda_{avg}$, as an abrasion loss level III; according to different abrasion loss levels of the brake shoe of the disc brakes, three different distributing means are executed on a total required braking force $F_{ref}$, where $k_1$ and $k_2$ denote coefficients for dividing the abrasion loss level of the brake shoes respectively;

Step S6, a total braking force $F_{sum}$ obeying an equal distribution principle, setting a braking force distribution value $F_i$ of the disc brakes as $$F_i = \frac{F_{sum}}{n},$$

in a case where the abrasion loss level of the brake shoe of the disc brakes is the abrasion loss level I;

Step S7, the total braking force $F_{sum}$ obeying a proportional distribution principle, setting the braking force distribution value $F_i$ of the disc brakes as $$F_i = F_{sum} \cdot \frac{\Delta_{i0} - \Delta_i}{\sum_{i=1}^{n} (\Delta_{i0} - \Delta_i)},$$

in a case where the abrasion loss level of the brake shoe of the disc brakes is the abrasion loss level II;

Step S8, the total braking force $F_{sum}$ obeying an index distribution principle, and setting the braking force distribution value $F_i$ of the disc brakes as $$F_i = F_{sum} \cdot \frac{e^{(\Delta_{i0} - \Delta_i)}}{\sum_{i}^{n} e^{(\Delta_{i0} - \Delta_i)}},$$

in a case where the abrasion loss level of the brake shoe of the disc brakes is the abrasion loss level III;

Step S9, by utilizing a pressure signal feedback from the oil pressure sensor arranged on an oil inlet chamber of the disc brake, a closed-loop tracking control of the disc brake for the braking force distribution value $F_i$ driven by a proportional directional valve is implemented, after completing a distribution of a braking pressure for the disc brake; and Step S10, completing a braking task, a dynamic distribution of the braking force is implemented, and repeating Step S1 to Step S9 in a case of requiring a subsequent braking operation.

2. The method for collaboratively controlling the multi-channel braking system of the mine hoist according to claim 1, wherein in Step S7, determining whether the braking force distribution value $F_i$ of the disc brakes is greater than $F_{max}$, where $F_{max}$ denotes a maximum braking force that a single disc brake is capable of supplying, wherein it is indicated that the disc brake reaches the maximum braking force that the single disc brake is capable of supplying, that is, the braking force of the disc brake is saturated, when the braking force distribution value $F_i$ of the disc brakes is greater than $F_{max}$; detecting a number m of the disc brakes that reach the saturated braking force, setting, for j disc brakes that reach the maximum braking force, a braking force distribution value as $F_j = F_{max}$, j=1, ..., m; calculating a remaining required braking force $F_{sur} = F_{sum} - m \cdot F_{max}$, and redistributing, for n−m disc brakes that do not reach the saturated braking force, a braking force $F_{sur}$, and setting a braking force distribution value $F_i$ of the n−m disc brakes that do not reach the saturated braking force as:

$$F_i = F_{sur} \cdot \frac{\Delta_{i0} - \Delta_i}{\sum_{i=1}^{n-m} (\Delta_{i0} - \Delta_i)}.$$

3. The method for collaboratively controlling the multi-channel braking system of the mine hoist according to claim 1, wherein in Step S8, determining whether the braking force distribution value $F_i$ of the disc brakes is greater than $F_{max}$, wherein it is indicated that the disc brake reaches the maximum braking force that the single disc brake is capable of supplying, that is, the braking force of the disc brake is saturated, when the braking force distribution value $F_i$ of the disc brakes is greater than $F_{max}$; detecting a number m of the disc brakes that reach the saturated braking force, setting, for m disc brakes that reach the maximum braking force, a braking force distribution value as $F_j = F_{max}$, j=1, ..., m; calculating a remaining required braking force $F_{sur} = F_{sum} - m \cdot F_{max}$, and redistributing, for n−m disc brakes that do not reach the saturated braking force, a braking force $F_{sur}$, and setting a braking force distribution value $F_i$ of the n−m disc brakes that do not reach the saturated braking force as:

$$F_i = F_{sur} \cdot \frac{e^{(\Delta_{i0} - \Delta_i)}}{\sum_{i}^{n-m} e^{(\Delta_{i0} - \Delta_i)}}.$$

4. The method for collaboratively controlling the multi-channel braking system of the mine hoist according to claim 1, wherein in a situation where it is indicated that the brake shoe of the disc brake is failed when the abrasion loss rate $\eta_i$ of the brake shoe of the i_th disc brake is greater than or equal to $\eta_{max}$, the hoist is terminated for maintenance, replacing the brake shoe, and then performing Step S2, where $\eta_{max}$ denotes a set safety threshold for the abrasion loss rate of the brake shoe.

5. The method for collaboratively controlling the multi-channel braking system of the mine hoist according to claim 4, wherein the safety threshold $\eta_{max}$ for the abrasion loss rate of the brake shoe ranges from 15% to 25%.

6. The method for collaboratively controlling the multi-channel braking system of the mine hoist according to claim 1, wherein the coefficients k1 and k2 for dividing the abrasion loss level of the brake shoes range from 1.5 to 2.5 and from 4.5 to 5.5, respectively.

7. The method for collaboratively controlling the multi-channel braking system of the mine hoist according to claim 1, wherein the proportional control valve is a three-position and four-way proportional control valve.

8. The method for collaboratively controlling the multi-channel braking system of the mine hoist according to claim 7, wherein a center position of a valve core of the three-position and four-way proportional control valve is a fully covered structure.

9. The method for collaboratively controlling the multi-channel braking system of the mine hoist according to claim 1, wherein the multi-channel braking system includes eight channels, one disc brake is arranged on each of the channels, and eight disc brakes are symmetrically distributed on both sides of a brake disc.

\* \* \* \* \*